US009903496B2

(12) United States Patent
Abouelleil et al.

(10) Patent No.: US 9,903,496 B2
(45) Date of Patent: Feb. 27, 2018

(54) LINING FOR MECHANICAL JOINTS

(71) Applicant: Mueller International, LLC, Atlanta, GA (US)

(72) Inventors: Ashraf Abouelleil, Oswego, IL (US); Steve Sharp, Naperville, IL (US); Purushottam Savalia, Aurora, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 14/725,837

(22) Filed: May 29, 2015

(65) Prior Publication Data

US 2016/0348800 A1 Dec. 1, 2016

(51) Int. Cl.
*F16K 27/02* (2006.01)
*F16K 1/226* (2006.01)

(52) U.S. Cl.
CPC ........ *F16K 27/0218* (2013.01); *F16K 1/2263* (2013.01); *F16K 27/0272* (2013.01)

(58) Field of Classification Search
CPC ............... F16K 27/0218; F16K 1/22
See application file for complete search history.

(56) References Cited

U.S. PATENT DOCUMENTS

| | | | | |
|---|---|---|---|---|
| 2,097,850 A * | 11/1937 | Wallace | ................ | F21V 31/005 164/111 |
| 3,306,573 A * | 2/1967 | Trefil | .................... | F16K 1/2265 251/306 |
| 3,603,341 A * | 9/1971 | Scaramucci | .......... | F16K 1/2263 137/375 |
| 3,990,675 A * | 11/1976 | Bonafous | .................. | F16K 1/22 137/375 |
| 4,067,534 A * | 1/1978 | Frey | ........................ | B29C 65/02 285/293.1 |
| 4,685,611 A * | 8/1987 | Scobie | .................. | F16K 1/2265 251/306 |
| 4,699,357 A * | 10/1987 | Sisk | ..................... | F16K 27/0218 137/315.17 |
| 5,360,030 A * | 11/1994 | Sisk | ...................... | F16K 1/2265 137/375 |
| 5,482,252 A * | 1/1996 | Kamezawa | ........... | F16K 1/2268 251/305 |
| 6,260,851 B1 * | 7/2001 | Baron | .................... | F16L 37/025 277/603 |
| 6,446,934 B2 * | 9/2002 | Bonomi | ............. | F16K 27/0218 251/306 |
| 7,357,372 B2 * | 4/2008 | Shakagori | ............. | F16K 1/2265 123/337 |

OTHER PUBLICATIONS

Cross-sectional views of a mechanical joint assembly. The mechanical joint assembly was publicly available prior to May 29, 2014, 2 pgs.

* cited by examiner

*Primary Examiner* — Kevin Murphy
*Assistant Examiner* — Patrick Williams
(74) *Attorney, Agent, or Firm* — Taylor English Duma LLP

(57) ABSTRACT

A mechanical joint includes a main body having an interior surface, an exterior surface, an inlet end, and an outlet end, the interior surface defining a fluid path from the inlet end to the outlet end, the interior surface defining a pipe seat proximate to a one of the inlet end and the outlet end, the pipe seat having a pipe seat stop surface facing towards the one of the inlet end and the outlet end; and a lining engaging the interior surface and covering at least a portion of the pipe seat stop surface of the pipe seat.

19 Claims, 6 Drawing Sheets

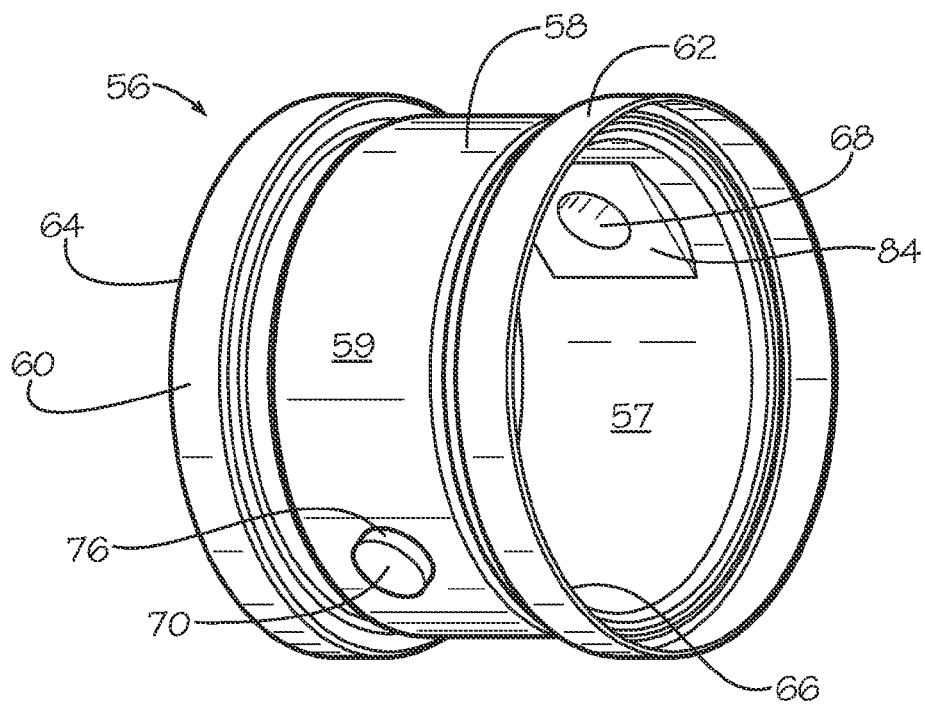
FIG. 3
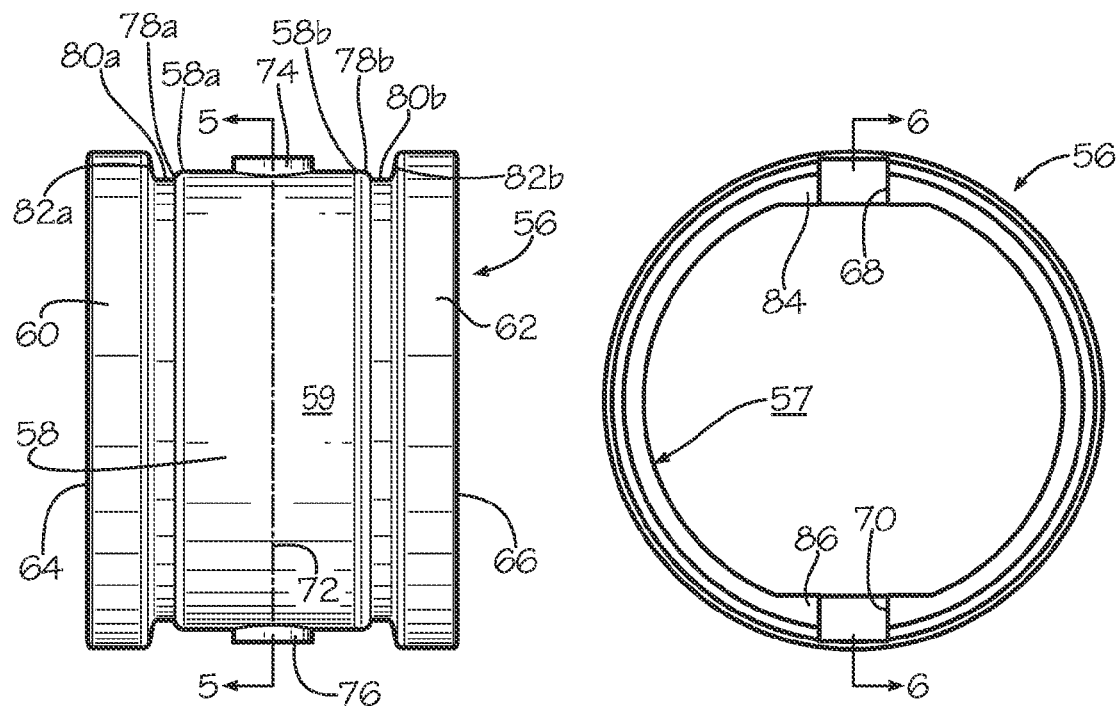
FIG. 4  FIG. 5

LINING FOR MECHANICAL JOINTS

TECHNICAL FIELD

This disclosure relates to mechanical joints. More specifically, this disclosure relates to linings for internal walls of mechanical joints.

BACKGROUND

A mechanical joint is any apparatus that connects two separate pipe elements to one another. One type of mechanical joint is a valve element, such as a butterfly valve, which is used to regulate or control the flow of material by opening, closing, or partially obstructing various passageways. When a pipe element is inserted into a mechanical joint, the pipe element may engage in metal-to-metal contact with the mechanical joint, potentially damaging the pipe element or the mechanical joint.

SUMMARY

Disclosed is a mechanical joint comprising a main body having an interior surface, an exterior surface, an inlet end, and an outlet end, the interior surface defining a fluid path from the inlet end to the outlet end, the interior surface defining a pipe seat proximate to a one of the inlet end and the outlet end, the pipe seat having a pipe seat stop surface facing towards the one of the inlet end and the outlet end; and a lining engaging the interior surface and covering at least a portion of the pipe seat stop surface of the pipe seat.

Also disclosed is a method of installing a pipe element into a mechanical joint, the method comprising obtaining mechanical joint, the mechanical joint including a body having an interior surface, an exterior surface, an inlet end defining an inlet, and an outlet end defining an outlet, the interior surface defining a fluid path from the inlet to the outlet; and a lining engaging the interior surface of the body; inserting a pipe element having a pipe end into a one of the inlet and the outlet; and bringing the pipe end into contact with the lining.

Also disclosed is a method of manufacturing mechanical joint, the method comprising forming a main body having an interior surface, an exterior surface, an inlet end, and an outlet end, the interior surface defining a fluid path from the inlet end to the outlet end, the interior surface defining a pipe seat proximate to a one of the inlet end and the outlet end, the pipe seat having a pipe seat stop surface facing towards the one of the inlet end and the outlet end; and covering at least a portion of the pipe seat stop surface of the pipe seat with a lining.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 3 is perspective view of an internal lining for a mechanical joint.

FIG. 4 is an elevation view of the lining of FIG. 3.

FIG. 5 is sectional view of the lining of FIG. 3, taken along line 5-5 in FIG. 5.

DETAILED DESCRIPTION

Disclosed is a mechanical joint and associated methods, systems, devices, and various apparatus. The mechanical joint includes a main body and a lining. It would be understood by one of skill in the art that the disclosed lining is described in but a few exemplary embodiments among many. No particular terminology or description should be considered limiting on the disclosure or the scope of any claims issuing therefrom.

Figure 1:
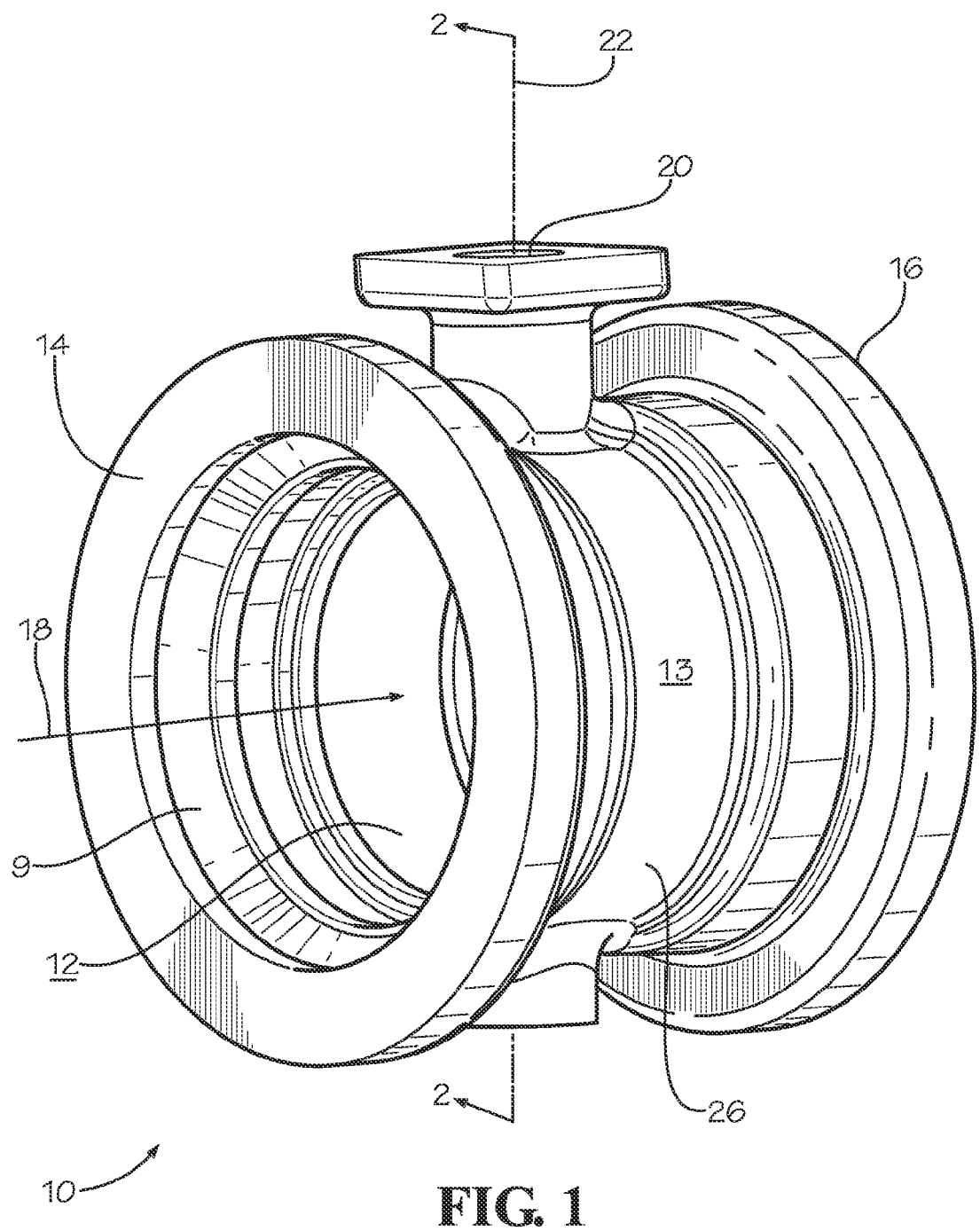
FIG. 1 is a perspective view of a butterfly valve body according to one embodiment of the current disclosure
Figure 2:
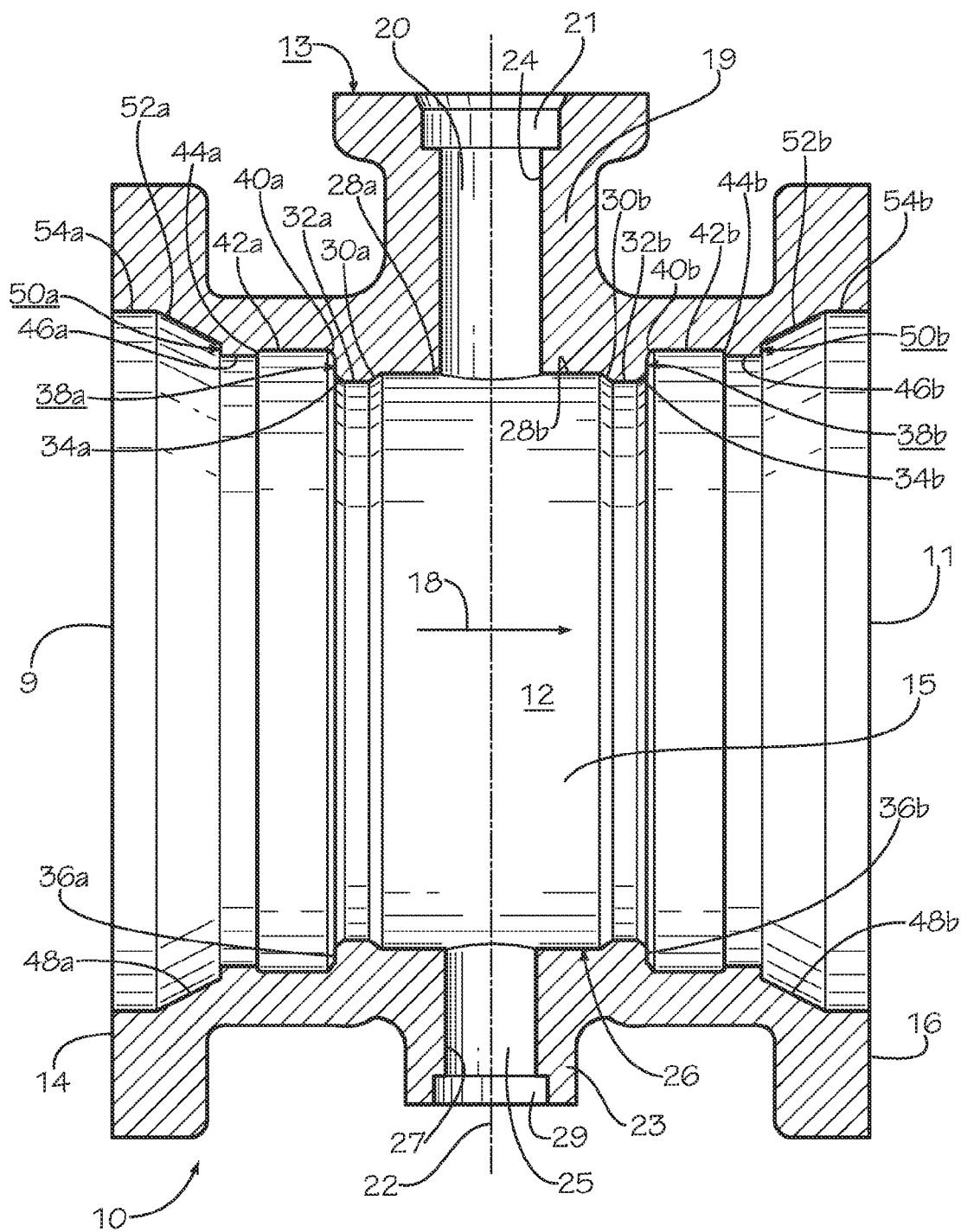
FIG. 2 is sectional elevation view of the butterfly valve body of FIG. 1, taken along line 2-2 in FIG. 1.

One embodiment of a mechanical joint is disclosed in FIGS. 1 and 2. FIG. 1 shows a main body 10 of the mechanical joint having an interior surface 12, an exterior surface 13, an inlet 9 terminating at an inlet end 14, and an outlet 11 (shown in FIG. 2) terminating at an outlet end 16. The interior surface 12 defines an internal chamber 15 and a fluid path 18 from the inlet 9 to the outlet 11. The fluid path 18 defines an axial direction through the main body 10 in the current embodiment. The main body 10 has a central portion 26 from which a neck 19 extends at least partially radially outwardly. The neck 19 defines an upper bore 20 extending from the interior surface 12 to the exterior surface 13. Upper bore 20 has a centerline 22 and a wall 24, and upper bore 20 communicates with the internal chamber 15. A portion of wall 24 flares outwardly to define an upper gasket seat 21. A shaft seat 23 extends at least partially radially outwardly from the central portion 26 opposite the neck 19. Shaft seat 23 defines a lower bore 25 having a wall 27. The lower bore 25 is coaxial with upper bore 20, so that centerline 22 defines an axis of symmetry for both bores 20,25. In the current embodiment, the mechanical joint is a butterfly valve, though the mechanical joint may be other valves or structures in various other embodiments, including gate valves, check valves or other backflow prevention valves, ball valves, or elbow joints, and the disclosure of a butterfly valve should not be considered limiting on the current disclosure.

As shown in FIG. 2, the central portion 26 of the main body 10 includes a first axial section 28a extending axially outwardly from the upper bore wall 24 toward inlet end 14 parallel to the fluid path 18, a first declined section 30a extending at least partially radially inwardly from the first axial section 28a, a second axial section 32a extending axially outwardly from the first declined section 30a, and a first inclined section 34a extending at least partially radially outwardly from the second axial section 32a. In the current embodiment, the main body 10, including the central portion 26, is symmetrical on either axial side of the upper bore wall 24 such that the sections between the wall 24 and the outlet end 16 are similar to the sections between the upper bore wall 24 and the inlet end 14, though in various other embodiments the main body 10 may not be symmetrical. A first axial section 28b extends axially outwardly from the upper bore wall 24 toward outlet end 16 parallel to the fluid path 18, a first declined section 30b extends at least partially radially inwardly from the first axial section 28b, a second axial section 32b extends axially outwardly from the first declined section 30b, and a first inclined section 34b extends at least partially radially outwardly from the second axial section 32b.

As shown in FIG. 2, the interior surface 12 of the main body 10 defines an inlet pipe seat 36a proximate to the inlet end 14 and an outlet pipe seat 36b proximate to the outlet end 16. Inlet pipe seat 36a includes an inlet pipe seat stop surface 38a extending at least partially radially outwardly from the first inclined section 34a orthogonal to the fluid path 18. The inlet pipe seat stop surface 38a of inlet pipe seat 36a faces towards the inlet end 14. Inlet pipe seat 36a also includes a second inclined section 40a extending at least partially radially outwardly from the inlet pipe seat stop surface 38a, a third axial section 42a extending axially outwardly from the second inclined section 40a toward the inlet end 14 and parallel to the fluid path 18, a second declined section 44a extending at least partially radially inwardly from the third axial section 42a, and a fourth axial section 46a extending axially outwardly from the second declined section 44a toward the inlet end 14. Similarly to inlet pipe seat 36a, outlet pipe seat 36b includes an outlet pipe seat stop surface 38b extending at least partially radially outwardly from the first inclined section 34b orthogonally to the fluid path 18. The outlet pipe seat stop surface 38b of outlet pipe seat 36b faces towards the outlet end 16. Outlet pipe seat 36b also includes a second inclined section 40b extending at least partially radially outwardly from the outlet pipe seat stop surface 38b, a third axial section 42b extending axially outwardly from the second inclined section 40b toward the outlet end 16 and parallel to the fluid path 18, a second declined section 44b extending at least partially radially inwardly from the third axial section 42b, and a fourth axial section 46b extending axially outwardly from the second declined section 44b toward the outlet end 16.

Referring again to FIG. 2, the interior surface 12 of the main body 10 also defines gasket seats 48a, 48b proximate to the inlet end 14 and the outlet end 16, respectively. Gasket seat 48a includes a gasket seat stop surface 50a extending at least partially radially outwardly from the fourth axial section 46a orthogonally to the fluid path 18, a third inclined section 52a extending at least partially radially outwardly from the fourth axial section 46a, and a fifth axial section 54a extending axially outwardly from the third inclined section 52a parallel to the fluid path 18, the fifth axial section 54a terminating at the inlet end 14. Similarly to gasket seat 48a, gasket seat 48b includes a gasket seat stop surface 50b extending at least partially radially outwardly from the fourth axial section 46b orthogonally to the fluid path 18, a third inclined section 52b extending at least partially radially outwardly from the fourth axial section 46b, and a fifth axial section 54b extending axially outwardly from the third inclined section 52b parallel to the fluid path 18, the fifth axial section 54b terminating at the outlet end 16.

One embodiment of an internal lining 56 is disclosed and described in FIG. 3. The shape of the lining 56 generally conforms to the interior surface 12 of the mechanical joint in which it will be placed. The lining 56 includes a cylindrical central section 58, having an inner surface 57 and an outer surface 59, and two pipe seat sections 60,62 interconnected to the central section 58, the pipe seat sections 60,62 terminating in inlet end 64 and outlet end 66, respectively.

As shown in FIG. 4, the central section 58 defines an upper aperture 68 and a lower aperture 70, sharing a common axis of symmetry 72. Raised ring portion 74 extends at least partially radially outwardly from the outer surface 59 about the periphery of upper aperture 68, and raised ring portion 76 extends at least partially radially outwardly from the outer surface 59 about the periphery of lower aperture 70. Central section 58 extends axially toward inlet end 64, terminating at a terminus 58a, and extends axially toward outlet end 66, terminating at a terminus 58b opposite from terminus 58a. A declined section 78a extends at least partially radially inwardly from the terminus 58a, an axial section 80a extends axially outwardly from the declined section 78a toward inlet end 64, and an inclined section 82a extends at least partially radially outwardly from the axial section 80a, terminating at pipe seat section 60. Similarly, a declined section 78b extends at least partially radially inwardly from a second terminus 58b, an axial section 80b extends axially outwardly from the declined section 78b toward outlet end 66, and an inclined section 82b extends at least partially radially outwardly from the axial section 80b, terminating at pipe seat section 62.

In various embodiments, the lining 56 is formed from a non-corrosive material such as rubber, including but not limited to EPDM rubber (ethylene propylene diene monomer), commercially-available, for example, under the mark Vistalon™ sold by ExxonMobil Corporation, or nitrile (also called "Buna-N") rubber, commercially available, for example, under the mark Nipol® sold by Zeon Chemicals L.P. However, other materials providing sufficient corrosion resistance, noise reduction, sealing characteristics, or prevention of metal-to-metal contact are contemplated as being within the scope of the present disclosure.

As seen in FIG. 5, the internal lining 56 includes an upper disc seat portion 84 and a lower disc seat portion 86 formed in the inner surface 57. Upper disc seat portion 84 extends at least partially radially inwardly from inner surface 57 about upper aperture 68, and lower disc seat portion 86 extends at least partially radially inwardly from inner surface 57 about lower aperture 70. In various embodiments, instead of being formed integrally with the lining 56, portions 84,86 may be formed as separate pieces and attached to inner surface 57 during manufacture of the lining 56. Disc seat portions 84,86 and inner surface 57 interact with a valve disc 100 (shown in FIG. 7), and function as a disc valve seat, which seals against the disc 100 when the disc 100 is turned to a closed position.

Figure 6:
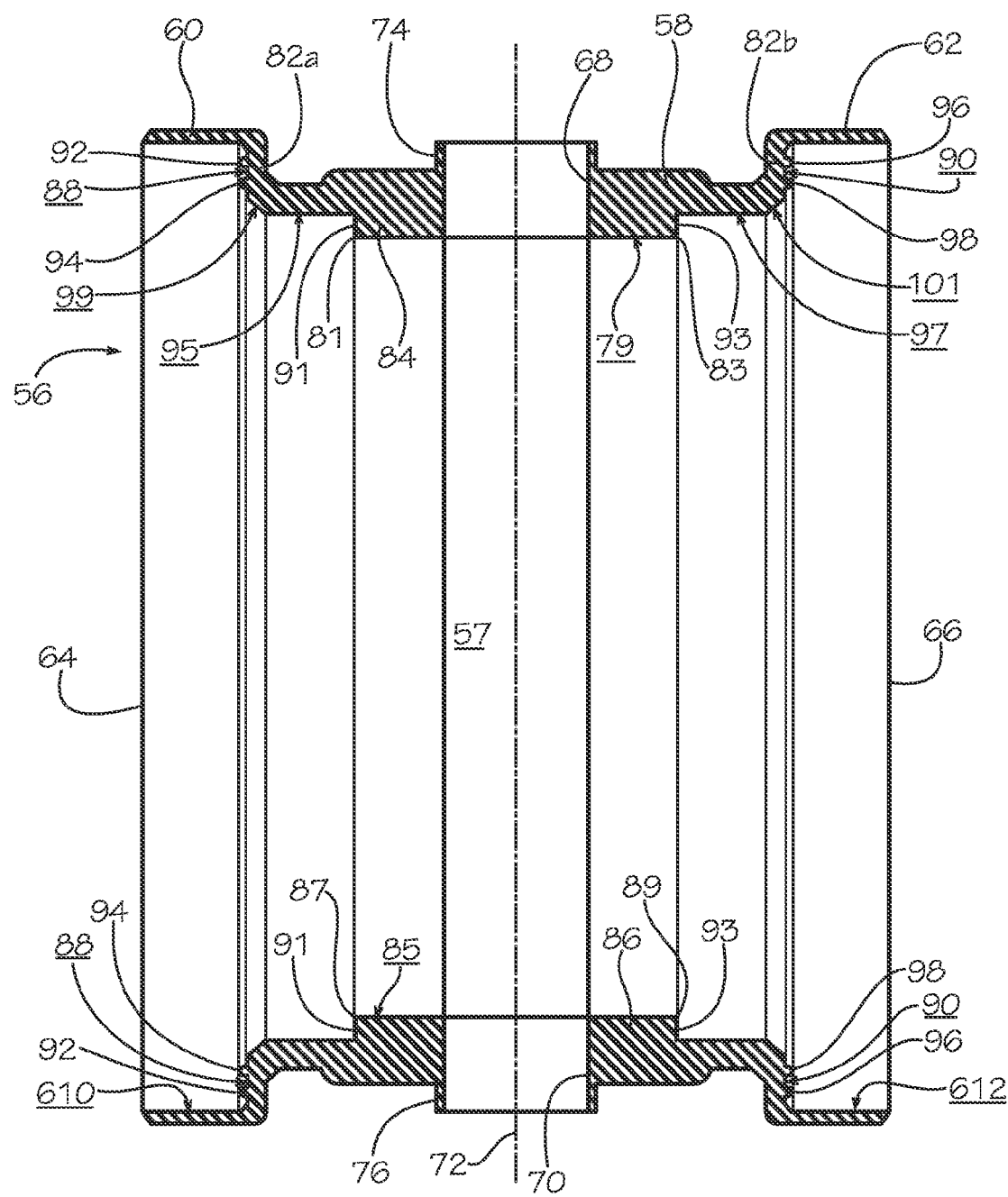
FIG. 6 is a sectional view of the lining of FIG. 3, taken along line 6-6 in FIG. 3.

Referring to FIG. 6, the upper disc seat portion 84 portion has a disc contact surface 79 extending axially outwardly from upper aperture 68 toward inlet end 64, terminating at inlet edge 81, and toward outlet end 66, terminating at outlet edge 83. Similarly, lower disc seat portion 86 has a disc contact surface 85 extending axially outwardly from lower aperture 70 both toward inlet end 64, terminating at inlet edge 87, and toward outlet end 66, terminating at outlet edge 89. Disc seat portions 84,86 together define an inlet side shoulder 91 extending at least partially radially outwardly from inlet edges 81,87, orthogonally to the fluid path 18 (shown in FIGS. 1 and 2). Disc seat portions 84,86 also together define an outlet side shoulder 93 extending at least partially radially outwardly from outlet edges 83,89, orthogonally to the fluid path 18 (shown in FIGS. 1 and 2). An inclined surface 99 extends at least partially radially outwardly from the axial surface 95, and an inclined surface 101 extends at least partially radially outwardly from the axial surface 97.

Referring again to FIG. 6, an inlet pipe contact surface 88 extends at least partially radially outwardly from inclined surface 99, orthogonally to the fluid path 18 (shown in FIGS. 1 and 2), such that surface 88 faces inlet end 64. Similarly, an outlet pipe contact surface 90 extends at least partially radially outwardly from inclined surface 101, orthogonally to the fluid path 18 (shown in FIGS. 1 and 2), such that surface 90 faces outlet end 66. A pair of spaced annular ribs 92,94 extends axially outwardly from inlet pipe contact surface 88 towards the inlet end 64, and a pair of spaced annular ribs 96, 98 extends axially outwardly from outlet pipe contact surface 90 towards the outlet end 66. In the current embodiment, the inlet pipe contact surface 88 includes two annular ribs 92,94, and the outlet pipe contact surface 90 includes two annular ribs 96,98, but any number of ribs, including zero ribs, may be present on either contact surfaces 88,90 in various embodiments, and the disclosure of two annular ribs 92,94 and two annular ribs 96,98 should not be considered limiting on the current disclosure.

A first deflection catch surface 610 extends axially from the inlet pipe contact surface 88 and a second deflection catch surface 612 extends axially from the outlet pipe contact surface 90, though in various other embodiments the deflection catch surfaces 610,612 may extend in directions at an angle to the axial direction. The first deflection catch surface 610 provides a stop surface to prevent contact between the main body 10 and an inlet pipe element 124 (shown in FIG. 7) during deflection or movement of the inlet pipe element 124 relative to the main body 10 during installation and use of the mechanical joint. Further, the second deflection catch surface 612 provides another stop surface to prevent contact between the main body 10 and an outlet pipe element 126 (shown in FIG. 7) during deflection or movement of the outlet pipe element 126 relative to the main body 10 during installation and use of the mechanical joint.

Figure 7:
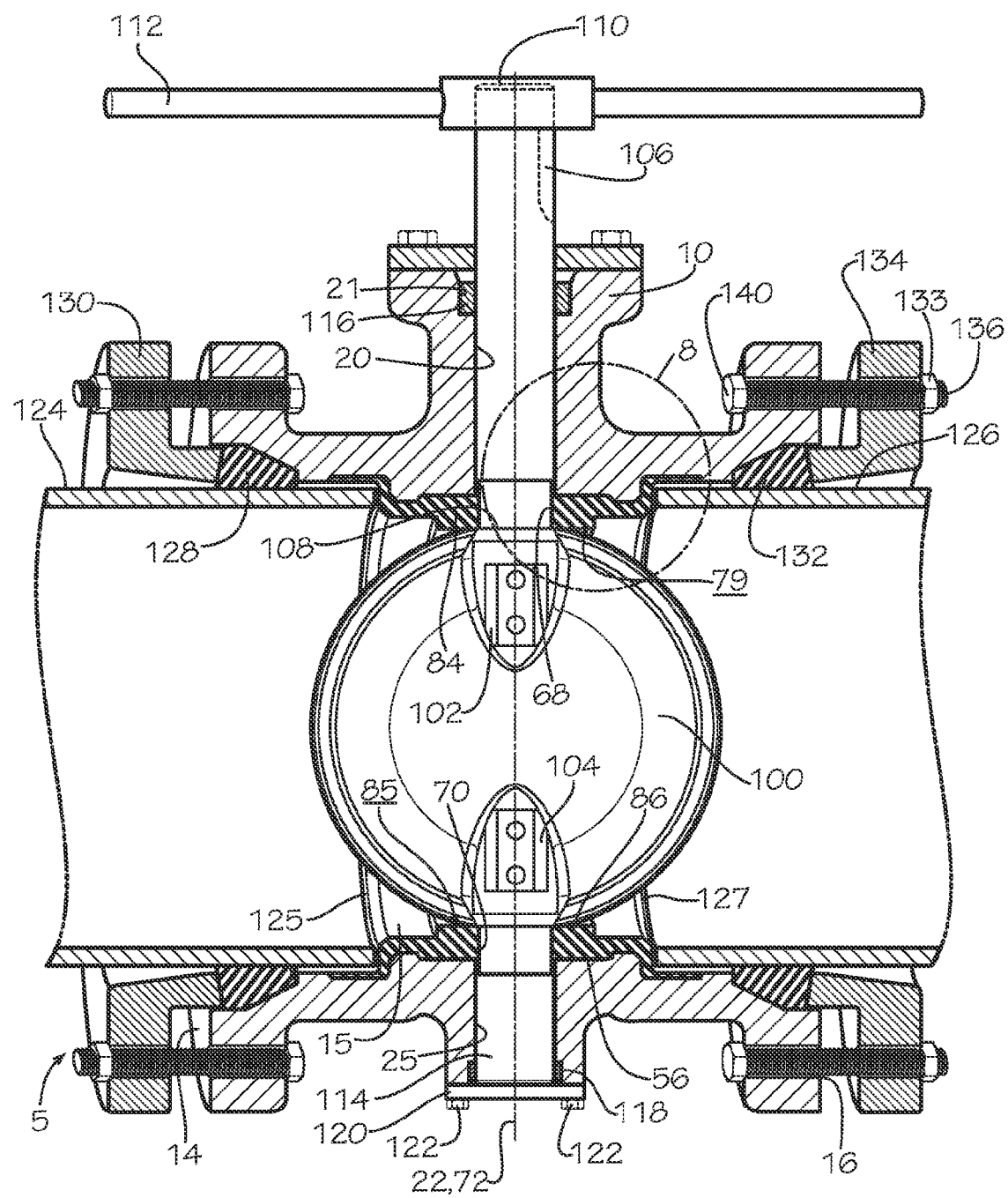
FIG. 7 is a sectional view of the lining of FIG. 3 taken along line 5-5 in FIG. 5 engaging the internal surface of the butterfly valve body illustrated in FIGS. 1 and 2 taken along line 2-2 in FIG. 1, also showing the engagement of the lining with pipe ends.

FIG. 7 illustrates a butterfly valve assembly 5. The butterfly valve disc 100 is positioned within the internal chamber 15 of the main body 10. Disc 100 is rotatable to a closed position to block the fluid path 18 (shown in FIGS. 1 and 2) between the inlet end 14 and the outlet end 16. Disc 100 contacts both the upper disc seat portion 84 and the lower disc seat portion 86 of the lining 56, forming the sealing provided by disc seat portions 84,86. An upper bearing member 102 is bolted onto an upper portion of the disc 100, and a lower bearing member 104 is bolted onto a lower portion of the disc 100 opposite the upper bearing member 102. A drive stem 106, having a lower end 108 and an upper end 110, is journaled within upper bore 20. The lower end 108 is attached to the upper bearing member 102, and the upper end 110 is attached to a handwheel 112. A guide shaft 114 is attached to the lower bearing member 104 and is journaled within the lower bore 25 of shaft seat 23. For sealing purposes, a stem gasket 116 is located within the upper gasket seat 21, and a shaft gasket 118 is located within the lower gasket seat 29 (shown in FIG. 2). An end cap 120 may be attached to the gasket seat 29 by bolts 122 to protect the guide shaft 114. With the disclosed construction, turning the handwheel 112 effects a rotation of the disc 100. Thus, if the disc 100 is rotated 90° (a quarter turn), fluid flow through the internal chamber 15 of the main body 10 is blocked. In this manner, rotation of the handwheel 112 regulates such fluid flow. In various other embodiments, the disc 100 may be rotated by other mechanisms, such as a drive motor, and the disclosure of handwheel 112 should not be considered limiting on the current disclosure.

FIG. 7 also illustrates the internal lining 56 positioned within the butterfly valve main body 10, such that centerline 22 of the bores 20,25 and the axis of symmetry 72 of the lining 56 coincide. An inlet pipe element 124, having an end 125, is shown inserted into the inlet 9 of the main body 10, and an outlet pipe element 126, having an end 127, is shown inserted into the outlet 11 of the main body 10. Inlet pipe element 124 is fluidly sealed from the environment by an inlet gasket 128, positioned within gasket seat 48a (shown in FIG. 2) and contacting the inlet pipe element 124. An inlet retaining gland 130 contacts the gasket 128 and presses it axially inwardly to retain both the inlet gasket 128 and the inlet pipe element 124 within the inlet 9. Similarly, outlet pipe element 126 is fluidly sealed from the environment by an outlet gasket 132, positioned within gasket seat 48b (shown in FIG. 2) and contacting the outlet pipe element 126. An outlet retaining gland 134 contacts the outlet gasket 132 and presses it axially inwardly to retain both the outlet gasket 132 and the outlet pipe element 126 within the outlet 11. Both glands 130,134 may be held in place in the manner shown at outlet end 16. There, an externally-threaded tie rod 136 extends through axial bores in the outlet 11 and in the outlet retaining gland 134. Nuts 138,140 are threaded onto opposed ends of the tie rod 136, such that further tightening of the nut 138 causes the gland 134 to exert additional pressure, in the axially inward direction, against the outlet gasket 132, and thus also against the outlet pipe element 126.

Figure 8:
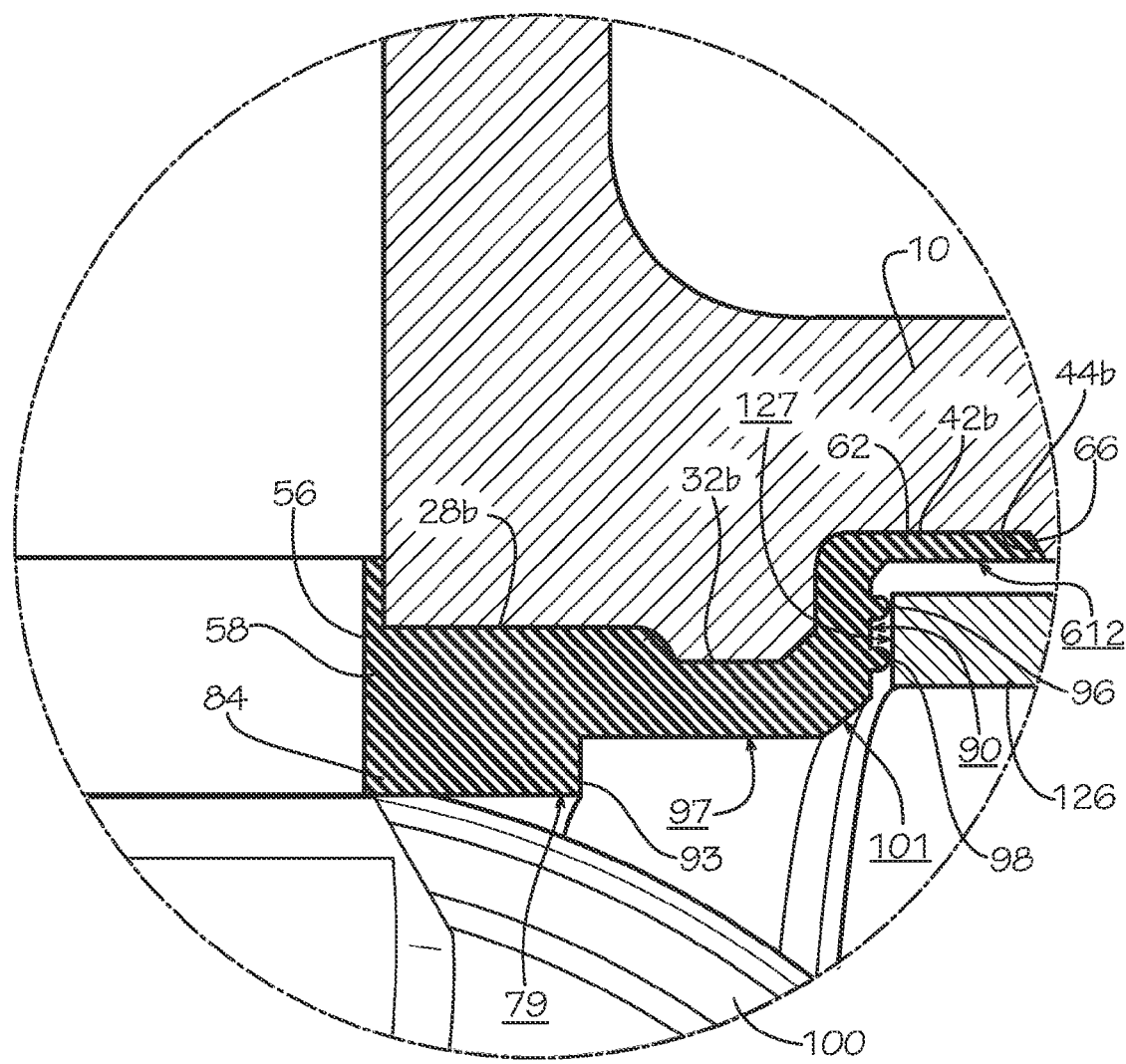
FIG. 8 is a detailed sectional elevation view of the portion taken from detail 8 in FIG. 7.

As shown in the detail view of FIG. 8, the lining 56 engages the interior surface 12 (shown in FIG. 1) of the main body 10. Specifically, the central section 58 of the lining 56 engages the first axial section 28b of the interior surface 12 and the axial section 80b of the lining 56 engages the second axial section 32b of the interior surface 12. Further the pipe seat section 62 of the lining 56 engages the second inclined section 40b, the third axial section 42b, and the second declined section 44b of the interior surface 12, which together form a groove to retain and prevent slippage of the pipe seat section 62 during installation and use. Additionally, the outlet end 66 of the lining 56 engages the second declined section 44b of the interior surface 12. Disc contact surface 79 of the upper seat portion 84 of lining 56 is shown contacting the valve disc 100.

In addition, similar to the engagement shown in FIG. 8, the central section 58 of the lining 56 engages the first axial section 28a of the interior surface 12 and the axial section 80a of the lining 56 engages the second axial section 32a of the interior surface 12. Further, the pipe seat section 60 of the lining 56 engages the second inclined section 40a, the third axial section 42a, and the second declined section 44b of the interior surface 12, which together form a groove to retain and prevent slippage of the pipe seat section 60 during installation and use. Additionally, the inlet end 64 of the lining 56 engages the second declined section 44a of the interior surface 12. The engagement of the aforementioned surfaces of lining 56 with the aforementioned sections of the interior surface 12 may be provided through molding of the main body 10, during its manufacture.

In various embodiments, the main body 10 is formed by casting and is formed from cast iron, though other methods or combinations of methods of forming the main body 10 may be present in various other embodiments, such as machining all or part of the main body 10. For example, in various embodiments the main body 10 may be formed by casting and the upper bore 20 and the lower bore 25 may thereafter be machined into the main body 10. In addition, the main body 10 may be formed from other material in various other embodiments, such as steel. In various embodiments, the lining 56 is overmolded onto the interior surface 12 of the main body 10, providing a tight fit with the main body 10 to prevent slippage of the lining 56 during installation and use. In various other embodiments, the lining 56 is formed separately, such as by injection molding or sand casting, and is thereafter applied to the interior surface 12 of the main body 10 after the lining 56 is formed, such as by collapsing the lining 56 and inserting the lining 56 into the internal chamber 15 through either of the inlet 9 or the outlet 11.

Also detailed in FIG. 8 is the contact of an end of a pipe element with the annular ribs of the lining 56. In particular, end 127 of the outlet pipe element 126 is shown contacting the annular ribs 96,98. Such contact provides not only further sealing of the internal surface 12 against corrosion, but also protection against metal-to-metal contact between the outlet pipe element 126 and the main body 10. The annular ribs 96,98 may, but need not, deform upon completion of the installation of the outlet pipe element 126 into the outlet 11. In the disclosed embodiment, the relationships between elements in the inlet side of axes 22,72 (shown in FIG. 7) parallel those described in FIG. 8 as to the elements in the outlet side of those axes. Specifically, referring to FIGS. 6 and 7, end 125 of the inlet pipe element 124 contacts the annular ribs 92,94. The annular ribs 92,94 may, but need not, deform upon completion of the installation of the inlet pipe element 124 into the inlet 9.

Several variations to the disclosed embodiment are contemplated. For instance, in various other embodiments, the lining 56 may not cover both pipe seat sections 36a, 36b (FIG. 2) of the main body 10. In various embodiments, the relationships between elements in the inlet side of axes 22,72 (FIG. 7) may not mirror the relationships discussed in FIGS. 7 and 8 with respect to the outlet side of axes 22,72. Further, in various embodiments, the lining 56 could be separated into two linings, one proximate to the inlet side of the main body 10, and one proximate to the outlet side of the main body 10.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A mechanical joint comprising:
a main body having an interior surface, an exterior surface, an inlet end, and an outlet end, the interior surface defining a fluid path of a valve configured to control flow from the inlet end to the outlet end, the interior surface defining an inlet pipe seat proximate to the inlet end and an outlet pipe seat proximate to the outlet end, the inlet pipe seat having an inlet pipe seat stop surface facing towards the inlet end and an outlet pipe seat stop surface facing towards the outlet end;
a lining engaging the interior surface and covering at least a portion of the inlet pipe seat stop surface of the inlet pipe seat and the outlet pipe seat stop surface of the outlet pipe seat, the lining comprising a central section, an inlet pipe contact surface positioned between the central section and an inlet end of the lining, and an outlet pipe contact surface positioned between the central section and an outlet end of the lining distal from the inlet end, the lining further comprising an inlet side shoulder positioned between an axial center of the lining and the inlet pipe contact surface and an outlet side shoulder positioned between an axial center of the lining and the outlet pipe contact surface, each of the inlet side shoulder and the outlet side shoulder orthogonal to the fluid path, an inner diameter of the lining greater at a position axially outward from the inlet side shoulder than at a position axially inward from the inlet side shoulder and an inner diameter of the lining greater at a position axially outward from the outlet side shoulder than at a position axially inward from the outlet side shoulder, the lining further comprising a first deflection catch surface between the inlet pipe contact surface and the inlet end and a second deflection catch surface between the outlet pipe contact surface and the outlet end, the first deflection catch surface extending axially from the inlet pipe contact surface and the second deflection catch surface extending axially from the outlet pipe contact surface;
an inlet gasket proximate to the inlet end of the main body and positioned between the inlet end and the first deflection catch surface and an outlet gasket proximate to the outlet end of the main body and positioned between the outlet end and the second deflection catch surface;
and wherein the inlet gasket, the outlet gasket, the first deflection catch surface, and the second deflection catch surface together are configured to
face a radially outermost exterior surface of a respective pipe element of a pair of pipe elements inserted into the mechanical joint and extending axially outward past the lining and the mechanical joint, and
form a barrier between the main body and the respective pipe element in a radial direction with respect to an axis of the pipe element, the barrier configured to prevent any contact between the main body and the respective pipe element.

2. The mechanical joint of claim 1, wherein the main body includes a central portion between the inlet end and the outlet end, and wherein the lining covers the central portion.

3. The mechanical joint of claim 1, wherein the main body defines a bore extending from the interior surface to the exterior surface in the central portion, the bore including a bore wall.

4. The mechanical joint of claim 3, wherein the lining extends axially outwardly from the bore wall towards the inlet pipe seat and the outlet pipe seat.

5. The mechanical joint of claim 1, further comprising the pipe element, the pipe element positioned within a one of the inlet end and the outlet end, a one of the first deflection catch surface and the second deflection catch surface facing a radially outermost exterior surface of the pipe element.

6. The mechanical joint of claim 1, wherein the inlet pipe contact surface covers the inlet pipe seat stop surface and the outlet pipe contact surface covers the outlet pipe seat stop surface, each of the inlet pipe contact surface and the outlet pipe contact surface extending orthogonally to the fluid path and facing the one of the inlet end and the outlet end.

7. The mechanical joint of claim 6, wherein the lining includes an annular rib extending axially outwardly from the inlet pipe contact surface towards the inlet end and an annular rib extending axially outwardly from the outlet pipe contact surface towards the outlet end.

8. The mechanical joint of claim 6, wherein the lining includes two pairs of spaced annular ribs, a first pair of spaced annular ribs extending axially outwardly from the inlet pipe contact surface towards the inlet end and a second pair of spaced annular ribs extending axially outwardly from the outlet pipe contact surface towards the outlet end.

9. The mechanical joint of claim 1, wherein the mechanical joint is a butterfly valve, the mechanical joint further comprising a valve disc positioned in the fluid path and rotatable to a closed position to block the fluid path between the inlet end and the outlet end.

10. The mechanical joint of claim 9, wherein the lining includes an inner surface, and wherein the inner surface seals against the valve disc when the valve disc is in the closed position.

11. The mechanical joint of claim 1, wherein the lining includes a non-corrosive material.

12. The mechanical joint of claim 11, wherein the non-corrosive material is one of EPDM rubber and Buna-N rubber.

13. A method of installing a pipe element into a mechanical joint, the method comprising:
obtaining a mechanical joint, the mechanical joint including:
a body formed from metal and having an interior surface, an exterior surface, an inlet end defining an inlet, and an outlet end defining an outlet, the interior surface defining a fluid path of a valve configured to control flow from the inlet to the outlet; and
a lining engaging the interior surface of the body and extending axially outwardly from a common axis of symmetry of the lining towards the inlet end and the outlet end of the body, the lining comprising a central section, a pipe contact surface positioned between the central section and the one of the inlet end and the outlet end of the lining, a deflection catch surface positioned between the pipe contact surface and the one of the inlet end and outlet end of the lining, and a side shoulder positioned between an axial center of the lining and the pipe contact surface, an inner diameter of the lining greater at a position axially outward from the side shoulder than at a position axially inward from the side shoulder;
providing a gasket proximate to one of the inlet end and outlet end of the body and positioned between the one of the inlet end and outlet end of the body and the deflection catch surface;
inserting a pipe element having a pipe end into a one of the inlet and the outlet, the pipe element extending axially outward past the lining and the mechanical joint;
and bringing the pipe end into contact with the lining so that the deflection catch surface faces a radially outermost exterior surface of the pipe element, the lining and the gasket together creating a barrier between the body and the pipe element in a radial direction with respect to an axis of the pipe element, the barrier configured to prevent any contact between the body and the pipe element.

14. The method of claim 13, wherein:
the lining includes the pipe contact surface extending orthogonally to the fluid path and facing the one of the inlet end and the outlet end; and bringing the pipe end into contact with the lining includes bringing the pipe end into contact with the pipe contact surface.

15. The method of claim 14, wherein:
the pipe contact surface includes an annular rib extending axially outwardly from the pipe contact surface towards the one of the inlet end and the outlet end; and
bringing the pipe end into contact with the lining includes bringing an axially outermost surface of the pipe end into contact with the annular rib to seal the pipe end against the annular rib.

16. A method of manufacturing a mechanical joint, the method comprising:
forming a main body from metal the main body having an interior surface, an exterior surface, an inlet end, and an outlet end, the interior surface defining a fluid path of a valve configured to control flow from the inlet end to the outlet end, the interior surface defining an inlet pipe seat proximate to the inlet end and an outlet pipe seat proximate to the outlet end, the inlet pipe seat having an inlet pipe seat stop surface facing towards the inlet end and an outlet pipe seat stop surface facing towards the outlet end;
covering at least a portion of the inlet pipe seat stop surface of the inlet pipe seat and the outlet pipe seat stop surface of the outlet pipe seat with a lining, the lining comprising a central section and terminating at an inlet end and an outlet end distal from the inlet end, the lining further comprising a first deflection catch surface between the central section and the inlet end and a second deflection catch surface between the central section and the outlet end, the lining further comprising an inlet pipe contact surface extending orthogonally to the fluid path and facing the inlet end and an outlet pipe contact surface extending orthogonally to the fluid path and facing the outlet end, the lining further comprising an inlet side shoulder positioned between an axial center of the lining and the inlet pipe contact surface and an outlet side shoulder positioned between an axial center of the lining and the outlet pipe contact surface, each of the inlet side shoulder and the outlet side shoulder orthogonal to the fluid path, an inner diameter of the lining greater at a position axially outward from the inlet side shoulder than at a position axially inward from the inlet side shoulder and an inner diameter of the lining greater at a position axially outward from the outlet side shoulder than at a position axially inward from the outlet side shoulder;

providing an inlet gasket proximate to the inlet end of the main body and positioned between the inlet end and the first deflection catch surface and an outlet gasket proximate to the outlet end of the main body and positioned between the outlet end and the second deflection catch surface;

wherein the inlet gasket, the outlet gasket, the first deflection catch surface, and the second deflection catch surface together face a radially outermost exterior surface of a respective pipe element of a pair of pipe elements inserted into the mechanical joint and extending axially outward past the lining and the mechanical joint, and form a barrier between the main body and the respective pipe element in a radial direction with respect to an axis of the pipe element, the barrier configured to prevent any contact between the main body and the respective pipe element.

17. The method of claim 16, wherein covering at least the portion of the inlet pipe seat stop surface and the outlet pipe seat stop surface of the pipe seat with the lining includes overmolding the lining on the main body.

18. The method of claim 16, further comprising forming a valve disc seat with the lining.

19. The method of claim 16, wherein the lining is symmetrical about an axis of symmetry.

\* \* \* \* \*